Feb. 27, 1923.
R. WHITEHEAD
PROJECTION APPARATUS
Filed Nov. 1, 1920
1,446,999
3 sheets-sheet 3
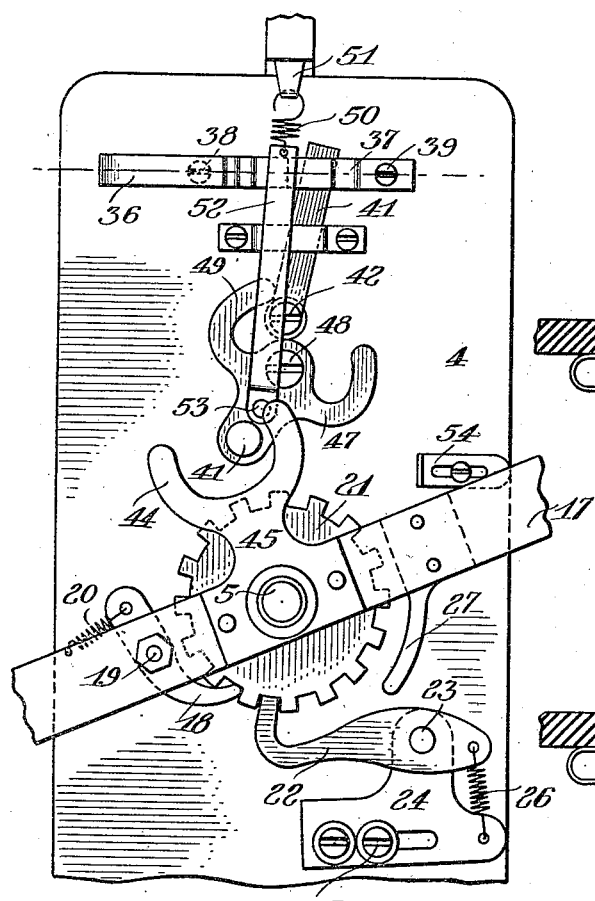
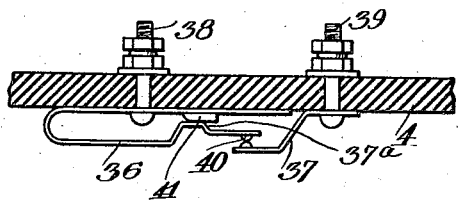
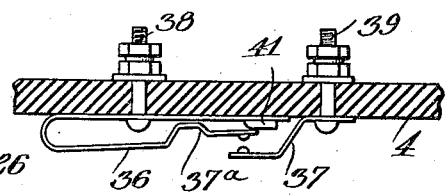
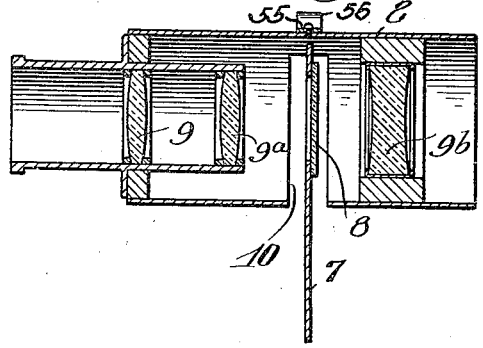
INVENTOR
Richard Whitehead
BY
his ATTORNEY Patented Feb. 27, 1923.

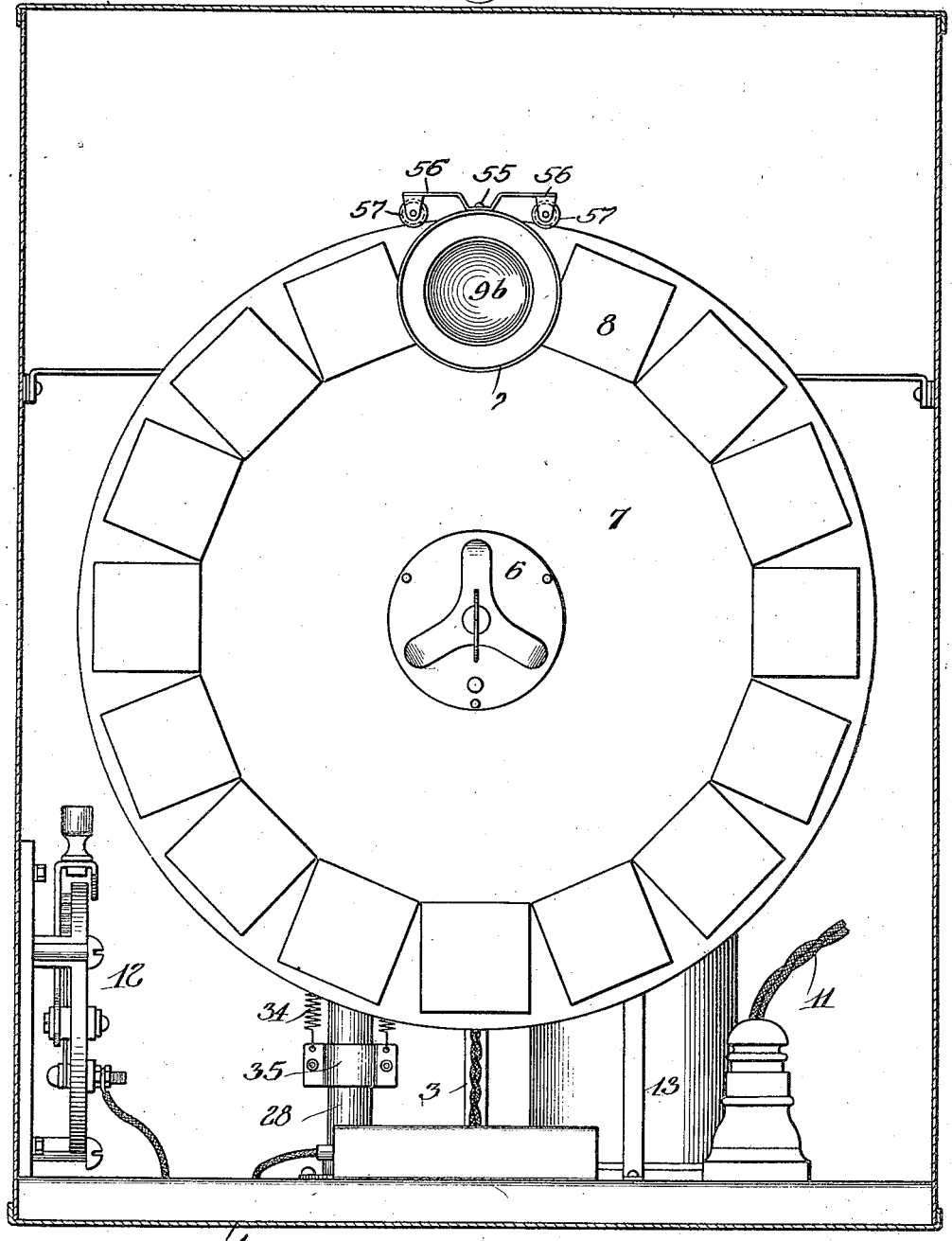

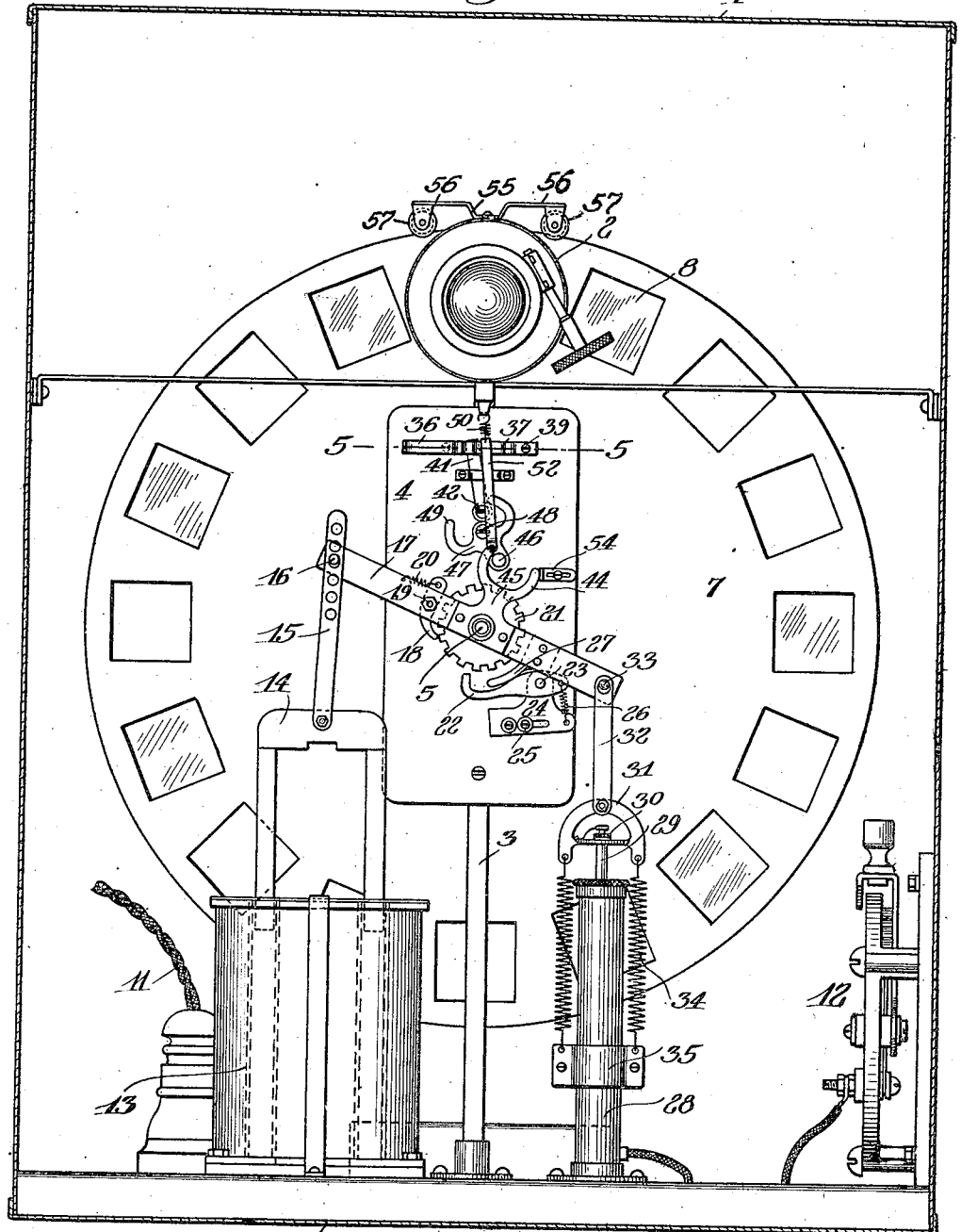

1,446,999

UNITED STATES PATENT OFFICE.

RICHARD WHITEHEAD, OF LOS ANGELES, CALIFORNIA, ASSIGNOR TO LINEATIME MFG. CO., INC., OF ROCHESTER, NEW YORK, A CORPORATION OF NEW YORK.

PROJECTION APPARATUS.

Application filed November 1, 1920. Serial No. 420,896.

*To all whom it may concern:*

Be it known that I, RICHARD WHITEHEAD, of Los Angeles, in the county of Los Angeles and State of California, have invented certain new and useful Improvements in Projection Apparatus; and I do hereby declare the following to be a full, clear, and exact description of the same, reference being had to the accompanying drawings, forming a part of this specification, and to the reference numerals marked thereon.

My present invention relates to optics and more particularly to projection apparatus and it has for its object to provide a simple, cheap and serviceable machine that will automatically project successively upon a screen a number or series of views and repeat the series automatically for as long as is desired. A further object of the invention is to provide a simple and accurate means for timing the period during which each view shall remain on the screen. To these and other ends the invention resides in certain improvements and combinations of parts all as will be hereinafter more fully described, the novel features being pointed out in the claims at the end of the specification.

In the drawings:

Figure 1 is a front view of a projection apparatus constructed in accordance with and illustrating one embodiment of my invention, the casing thereof being shown in vertical section;

Figure 2 is a rear view thereof with the casing similarly in section and the feeding mechanism in the position occupied when it is about to feed a new view into the focal plane;

Figure 3 is an enlarged fragmentary view of certain parts of the mechanism after a given feeding operation has been completed;

Figure 4 is a longitudinal sectional view through the projector tube showing a fragment of the view carrier;

Figure 5 is an enlarged sectional view through the switch on the line 5—5 with the circuit closed, and Figure 6 is a view similar to Figure 5 but showing the circuit open.

Similar reference numerals throughout the several views indicate the same parts.

The apparatus shown in the present embodiment of the invention is designed more particularly for store window display and is available for use as an advertising medium particularly at night when the store is closed and dark, in which case the machine will project successive views illustrative or descriptive of the owner's business in a manner to attract attention and as long as current is supplied. As my invention relates more particularly to the mechanism for changing the views, I have not illustrated the exterior appearance of the machine and it is sufficient to say that it is suitably enclosed in a casing 1 in a light-tight manner, except for the lens tube 2 of the projector proper which extends to the exterior sufficiently to project the cone of light onto a properly arranged screen.

Within the box-like casing is a standard 3 carrying an upright plate 4 upon which certain of the mechanism is mounted and through which extends, from front to rear, the horizontal shaft 5. Mounted on the shaft 5 by means of a suitable hub 6 is a disc 7 to rotate in a vertical plane and having the series of slides, pictures or transparencies 8 peripherally arranged thereon and mounted in any suitable manner. The disc 7 rotates in the focal plane of the lens system 9, 9$^a$, 9$^b$ shown in section in Figure 4 within the projector tube 2 and the latter is transversely slotted at 10 to admit the periphery of the disc so that each view, as the disc is rotated, may be presented in the axis of the lenses. The source of light for causing the projection of the image is not shown but may be arranged as usual. Mechanism is provided for rotating the disc 7 intermittently in one direction or with a step-by-step motion in which each picture area 8 is successively presented within the tube for projection during a prescribed time which time period is determined in the manner hereinafter described.

Current is supplied to the machine through lead-in-wires 11 in circuit with suitable controlling mechanism indicated generally at 12 and energizes field or windings 13 of a solenoid having a vertically movable armature 14. The pull rod 15 on the armature is adjustably connected at 16 to one end of a rock beam 17 fulcrumed on the shaft 5 and carrying a feed pawl 18 pivoted at 19 thereon. A spring 20 holds this feed pawl in engagement with a ratchet wheel 21 on the disc 7 and when the solenoid is energized and the armature thereof drawn down, the beam 17 is rocked from the position of Figure 2 to that of Figure 3. The feed pawl 18 normally rests on top of one of the flat teeth of the ratchet and during such movement, it engages the next tooth and moves it a distance of one tooth, thereby carrying the disc around to bring a fresh picture into the axis of the projector 2. At this point also, a holding pawl 22 pivoted at 23 to a bracket 24 adjustably mounted on the plate 4 at 25 which pawl is actuated by a spring 26 locks with the ratchet as shown in Figure 3 while the beam 17 and its feed pawl 18 return to the initial position of Figure 2 through the deenergization of the solenoid as hereinafter explained. When the beam has so returned, a cam-shaped arm 27 on the opposite side of its pivot engages the holding pawl 22 and trips it, as shown in Figure 2 at which point the solenoid becomes energized again and the operation is immediately repeated, but the holding pawl 22 is in engagement as in Figure 3, during the major part of the turn of the beam and during the period that a given picture is being projected so that the disc is locked against rotation and the picture held steady during that period.

The duration of projection of each picture thus fed is determined by a dash pot 28 the cylinder of which is fixed to the floor or the casing 1 and the piston rod of which is shown at 29. The latter is hollow for the escape of the air under the control of a suitable adjusting device arranged at 30 and of well known construction which it is thought unnecessary to illustrate in detail herein. A yoke 31 on the outer end of the piston rod is connected by a pull rod 32 at 33 with the other end of the rock beam 17 and also connected to the said yoke are the upper ends of a pair of springs 34 the lower ends of which are anchored at 35 to a clip fixed to the dash pot cylinder. It is these springs which return the beam 17 to the position of Figure 2 after actuation by the solenoid and while the same is deenergized and as they act directly against or through the dash pot, the regulatable resistance offered by the latter determines the length of time consumed by the return of the beam and hence the duration of projection of the picture that is fed.

The circuit through the field windings 13 of the solenoid includes a switch composed of contacts 36 and 37 connected, respectively, to binding posts 38 and 39, as shown in detail in Figures 5 and 6. The points 40 of these spring contact members are normally open or separated as shown in Figure 6, but the movable element 36 has a cam 37ª formed thereon that is adapted to be engaged by an arm 41 pivoted to the plate 4 at 42. When this arm is moved to the left as in Figures 2 and 5, it rides the cam and closes the contacts 40. Thus, in Figure 2 the solenoid has just been energized through the throwing of this switch, but has not yet pulled down the beam 17. As it pulls the beam to the position of Figure 3, the finger 44 of a bifurcated arm 45 mounted on the beam 17 engages a pin 46 on a bifurcated actuator 47 pivoted to the plate 4 at 48. A finger 49 on this actuator in turn engages the arm 41 and quickly throws it to the right as in Figure 3 to open the switch as shown in Figure 6 and this is done very quickly to prevent arcing and for other obvious reasons, by a spring 50 having its upper end suitably anchored at 51 and its lower end connected by a link 52 to the actuator 47 at a pivotal point 53 which is thrown across the center of the actuator by the tripping action of the bifurcated arm 45 on the rock beam. Therefore, the solenoid breaks its own circuit through the medium of the beam as soon as it has functioned and the parts have reached the position of Figure 3. When the springs 34 have returned the beam far enough toward the initial position of Figure 2, the switch arm 41 is again thrown in a similar manner by the action of the other fingers or bifurcations of the arm 45 and actuator 47, as shown in Figure 2, and the switch is closed again as in Figure 5.

An adjustable abutment 54 is mounted on the plate 4 to be engaged by the finger 44 of the arm 45, as shown in Figure 2, and limit the position to which the rock beam 17 is returned by the springs 34, which position is limited to just permit the throwing of the switch arm 41. The action of the solenoid in the other direction is, of course, limited by the engagement of the holding pawl 22.

In order to prevent the view carrier 7 from overthrowing and to frictionally center it in its positions of rest, I provide a bracket 55 secured to the top of the lens tube 2 and embodying spring arms 56 carrying grooved rollers 57 that ride on the periphery of the disk 7 on opposite sides of the lens tube.

I claim as my invention:

1. In a projection apparatus, the combination with a projector and a rotary view carrier cooperating therewith to present successive views in the focal plane thereof, of feeding mechanism including a rocking beam for rotating the view carrier step by step, an electrically energized device for rocking the beam in one direction and connected to one end thereof, time controlled means for returning it connected to the other end thereof, a switch in the circuit of said device and means on the beam for throwing said switch.

2. In a projection apparatus, the combination with a projector, a rotary view carrier cooperating therewith to present successive views in the focal plane thereof, a plate, and a shaft for the carrier extending through the plate, of feeding mechanism including a rocking beam pivoted on the same axis with the carrier, for rotating the latter step by step, an electrically energized device for rocking the beam in one direction, time controlled means for returning it, a switch on the plate arranged in the circuit of said device and an arm on the beam for throwing said switch.

3. In a projection apparatus, the combination with a projector and a rotary view carrier cooperating therewith to present successive views in the focal plane thereof, of feeding mechanism including a rocking beam for rotating the view carrier step by step, an electrically energized device for rocking the beam in one direction, time controlled means for returning it, a spring actuated switch in the circuit of said electrical device and a bifurcated arm on the beam for throwing said switch.

4. In a projection apparatus, the combination with a projector and a rotary view carrier cooperating therewith to present successive views in the focal plane thereof, of feeding mechanism including a rocking beam for rotating the view carrier step by step, an electrically energized device for rocking the beam in one direction, time controlled means for returning it, a switch in the circuit of said electrical device, a pivoted bifurcated actuator therefor, a spring connected to cross the pivot of said actuator and operate the switch in two directions and a bifurcated arm on the beam adapted to shift the actuator.

5. In a projection apparatus, the combination with a projector, a rotary view carrier cooperating therewith to present successive views in the focal plane thereof and a shaft for the carrier having a ratchet wheel thereon, of a feeding mechanism including a rocking beam on said shaft, means for rocking the beam in one direction, time controlled means for returning it, a feed pawl on the beam cooperating with the ratchet, a holding pawl also cooperating therewith and means on the beam adapted to throw out the holding pawl in advance of the effective engagement of the feeding pawl.

6. In a projection apparatus, the combination with a projector, a rotary view carrying disk cooperating therewith to present successive views in the focal plane thereof and means for rotating the carrier with a step by step motion, of a centering and tensioning device mounted on the projector and including rollers traveling on the periphery of the view carrier.

RICHARD WHITEHEAD.